US009300865B2

(12) United States Patent
Wang et al.

(10) Patent No.: US 9,300,865 B2
(45) Date of Patent: Mar. 29, 2016

(54) RANDOM IMAGING

(71) Applicant: GOODRICH CORPORATION, Charlotte, NC (US)

(72) Inventors: Hongcheng Wang, Farmington, CT (US); Alan Matthew Finn, Hebron, CT (US); Serge L. Shishkin, Marlborough, CT (US); Sergei F. Burlatsky, West Hartford, CT (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 14/162,895

(22) Filed: Jan. 24, 2014

(65) Prior Publication Data
US 2015/0215529 A1    Jul. 30, 2015

(51) Int. Cl.
| H04N 3/14 | (2006.01) |
| H04N 5/228 | (2006.01) |
| H04N 5/232 | (2006.01) |
| G06K 9/20 | (2006.01) |
| G06T 5/50 | (2006.01) |
| H04N 5/235 | (2006.01) |
| H04N 9/04 | (2006.01) |
| G06T 5/00 | (2006.01) |

(52) U.S. Cl.
CPC .......... *H04N 5/23229* (2013.01); *G06K 9/2018* (2013.01); *G06T 5/007* (2013.01); *G06T 5/50* (2013.01); *H04N 5/2355* (2013.01); *H04N 9/045* (2013.01); *G06T 2200/21* (2013.01); *G06T 2207/10144* (2013.01); *G06T 2207/20021* (2013.01); *G06T 2207/20081* (2013.01); *G06T 2207/20208* (2013.01); *H04N 2209/045* (2013.01)

(58) Field of Classification Search
CPC ............ H04N 9/045; H04N 2209/046; H04N 1/32245; H01L 27/14621; H01L 27/14627; G06T 3/4015
USPC .................................................. 348/272–278
See application file for complete search history.

(56) References Cited

U.S. PATENT DOCUMENTS

| 6,864,916 B1 | 3/2005 | Nayar et al. |
| 7,924,321 B2 | 4/2011 | Nayar et al. |

(Continued)

FOREIGN PATENT DOCUMENTS

| CN | 102801984 A | 11/2012 |
| WO | 2011063311 A2 | 5/2011 |

OTHER PUBLICATIONS

Michal Aharon, Michael Elad, and Alfred Bruckstein, K-SVD: An Algorithm for Designing Overcomplete Dictionaries for Sparse Representation. IEEE Trans. Signal Processing, 54:3114322, 2006.

(Continued)

*Primary Examiner* — Sinh Tran
*Assistant Examiner* — Selam Gebriel
(74) *Attorney, Agent, or Firm* — Carlson, Gaskey & Olds

(57) ABSTRACT

An image processing system comprises a filter associated with a sensor array, which is operable to capture an image. The filter is provided to separate a plurality of distinct qualities of light from the scene to be captured. The filter has filter portions associated with the plurality of distinct qualities of light which are spatially pseudo-randomly ordered relative to each other. The image processing system also comprises an image reconstruction algorithm specifically designed to operate with the filter.

15 Claims, 3 Drawing Sheets

(56) References Cited

U.S. PATENT DOCUMENTS

2006/0239336 A1* 10/2006 Baraniuk ............... H04L 25/20 375/216
2011/0142339 A1* 6/2011 Singh et al. ................ 382/166
2011/0157419 A1 6/2011 Nayar et al.

OTHER PUBLICATIONS

Richard Baraniuk, Mark Davenport, Ronald Devore, Michael Wakin. A Simple Proof of the Restricted Isometry Property for Random Matrices. Constr. Approx., 2008.

Emmanuel J. Candes, Xiadong Li, Yi Ma, and John Wright. Robust Principal Component Analysis? Journal of the ACM, 58(1):137, 2011.

Emmanuel J. Candes and Benjamin Recht. Exact Matrix Completion via Convex Optimization. Foundations of Computational Mathematics, 9:717772, 2009.

Emmanuel Candes and Terence Tao. Decoding by Linear Programming. IEEE Trans. Inf. Theory, 51(12)(12):42034215, 2005. http://arxiv.org/pdf/math/0502327.pdf.

Scott Shaobing Chen, David L. Donoho, Michael A. Saunders. Atomic Decomposition by Basis Pursuit SIAM Rev., 43:129159, 2001.

Paul E. Debevec, Jitendra Malik. Recovering High Dynamic Range Radiance Maps from Photographs. ACM SIGGRAGH, p. 369378, 1997.

Felix Krahmer and Rachel Ward. New and improved Johnson-Lindenstrauss embeddings via the Restricted Isometry Property. SIAM J. Math. Anal., 43(3):12691281, 2011.

Tom Mertens, Jan Kautz, Frank Van Reeth. Exposure Fusion. Pacific Conference on Computer Graphics and Applications, 2007.

Shree K. Nayar, Tomoo Mitsunaga. Radiometric Self Calibration. CVPR, 1999.

Ron Rubinstein, Tomer Peleg, Michael Elad. Analysis K-SVD: A Dictionary-Learning Algorithm for the Analysis Sparse Model. IEEE Trans. Signal Processing, 61:661-677, 2013.

Serge L. Shishkin, Hongcheng Wang, and Gregory S. Hagen. Total Variation Minimization with Separable Sensing Operator. International Journal of Future Generation Communication and Networking (IJFGCN), 3:55-66, 2010.

Mingyuan Zhou, Haojun Chen, John Paisley, Lu Ren, Guillermo Sapiro and Lawrence Carin. Nonparametric Bayesian Dictionary Learning for Sparse Image Representations. Neural Information Processing Systems, 21, 2009.

Mingyuan Zhou, Haojun Chen, John Paisley, Lu Ren, Lingbo Li, Zhengming Xing, David Dunson, Guillermo Sapiro and Lawrence Carin. Nonparametric Bayesian Dictionary Learning for Analysis of Noisy and Incomplete Images. IEEE Trans. Image Processing, 21 (1):130-144, 2012.

European Search Report for European Patent Application No. 15151816.4 mailed Aug. 10, 2015.

Laurent Condat: "A new random color filter array with good spectral properties", Image Processing (ICIP), 2009 16th IEEE International Conference ON, IEEE, Piscataway, NJ, USA, Nov. 7, 2009, pp. 1613-1616.

Laurent Condat: "Color filter array design using random patterns with blue noise chromatic spectra", Image and Vision Computing, vol. 28, No. 8, Aug. 1, 2010, pp. 1196-1202.

* cited by examiner

RANDOM IMAGING

BACKGROUND

This application relates to an image acquisition and image processing technique where the image is captured utilizing a spatially pseudo-randomly ordered filter.

Image reconstruction is inherent in any number of technical areas. As an example, surveillance aircraft capture images at multiple wavelengths which must be reconstructed to provide information. These images must be captured relatively quickly, and the accuracy, spatial resolution, and dynamic range must be as high as possible.

To date, images have generally been captured with a sensor array (a camera) provided with a filter. The filter breaks the incoming light into different levels. In one example, the different levels may be intensity levels, although different spectral levels (the colors red, blue, green, for instance) may also be separated by the filter. It is also known to use different filters to separate other qualities within the light.

To date, these filters have generally been provided in a regular pattern for light in the human-visible portion of the electromagnetic spectrum. There is no inherent restriction, however, to extending these filters to other portions of the electromagnetic or acoustic spectrums or properties of electromagnetic or acoustic waves.

As an example, in FIG. 1, a sensor focal plane array (FPA) 20 is illustrated having a spatially regular mask 22 with two different intensity attenuation levels 24, 26. The mask 22 is shown detached from FPA 20 for illustration purposes; typically these are attached to each other. The light rays 28, 30 from scene 32 are filtered by the different intensity attenuation levels 24, 26 resulting in a patchwork image 34. As can be appreciated, the different intensities in the resulting images are regularly spaced or geometrically ordered, corresponding to the spatial regularity of mask 22. If filter levels 24, 26 comprise bandpass or bandstop filters for different wavelengths, then the resulting images are geometrically ordered by wavelength. If filter levels 24, 26 comprise different polarizations, then the resulting images are geometrically ordered by polarization, etc. It is known in the art that patchwork image 34 may be reconstructed into a high dynamic range (HDR) image by a reconstruction technique that includes interpolation.

There are intrinsic problems for this imaging scheme. Due to the grid-like sampling, the image is reconstructed by interpolation, which usually results in loss of spatial resolution and/or loss of high spatial frequency components of the images.

Alternatives to the described high dynamic range (HDR) imaging using an intensity attenuation mask include taking multiple exposures of different exposure times, using multiple sensors and beam splitters, or fabricating an FPA with multiple sized pixels. The first alternative suffers image degradation especially for moving objects; the second alternative suffers increased cost; the third alternative suffers decreased spatial resolution.

Some literature describing image processing techniques has indicated that the filters need not be ordered or regularly spaced, and that some reconstruction techniques may work with random filter arrangements. However, there is no benefit or instruction to utilize such a random filter in this literature.

SUMMARY

An image processing system comprises a filter associated with a sensor array, which is operable to capture an image. The filter is provided to separate a plurality of distinct qualities of light from the scene to be captured. The filter has filter portions associated with the plurality of distinct qualities of light which are spatially pseudo-randomly ordered relative to each other. The image processing system also comprises an image reconstruction algorithm specifically designed to operate with the filter.

These and other features will be best understood from the following specification and drawings, the following of which is a brief description.

DETAILED DESCRIPTION

This disclosure relates to capturing a pseudo-randomly filtered image. The following description is merely exemplary in nature and is in no way intended to limit the disclosure, its application, or uses.

Figure 1:
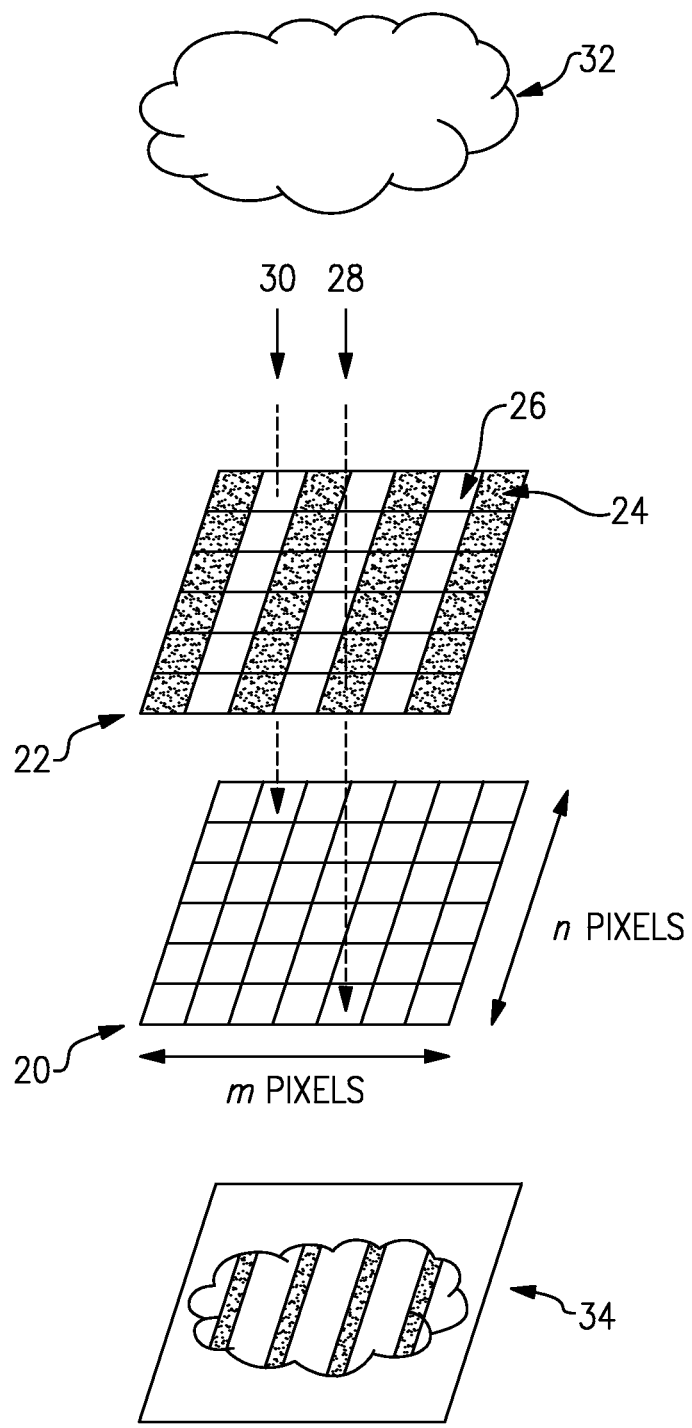
FIG. 1 shows a prior art filter and focal plane array.
Figure 2:
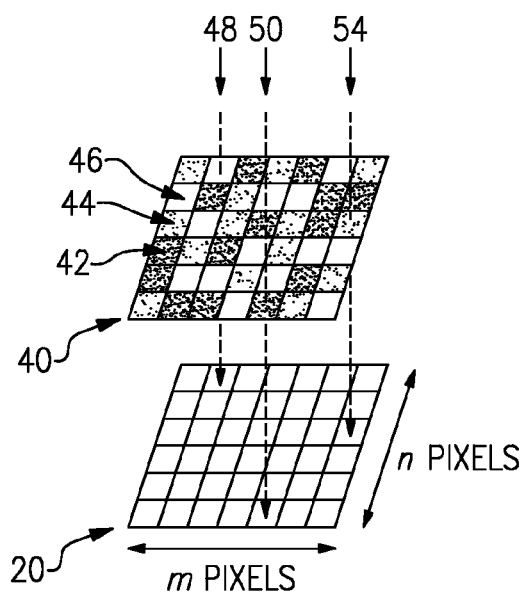
FIG. 2 shows a pseudo-random filter.

In FIG. 2, a sensor focal plane array (FPA) 20 is illustrated having a spatially pseudo-random mask 40 with three different intensity attenuation levels 42, 44, 46. The mask 40 is shown detached from FPA 20 for illustration purposes; typically these are attached to each other. The light rays 48 50, 54 from a scene are filtered by the different attenuation levels 42, 44, 46 resulting in a patchwork image. As can be appreciated, the different intensities in the resulting images are irregularly spaced or geometrically unordered, corresponding to the spatial irregularity of mask 40. If filter levels 42, 44, 46 comprise bandpass or bandstop filters for different wavelengths, then the resulting images are a pseudo-random patchwork by wavelength. If filter levels 42, 44, 46 comprise different polarizations, then the resulting images are a pseudo-random patchwork by polarization, etc. It will be shown that these pseudo-random patchwork images may be reconstructed into, e.g., a high dynamic range (HDR) image, with higher quality than previously known.

Figure 3:
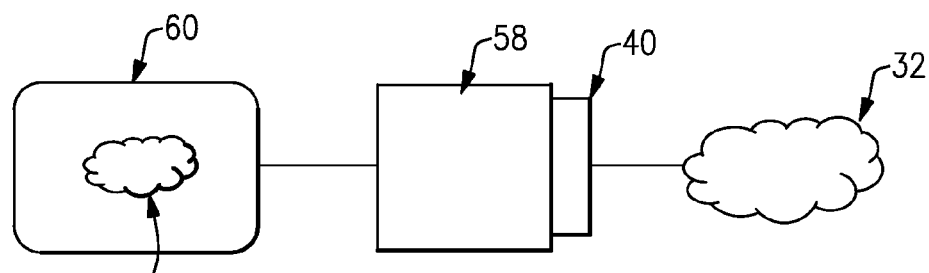
FIG. 3 is a schematic of a system.

As shown in FIG. 3, the filter 40 may be associated with a sensor or camera 58 containing FPA 20 and communicating with a processor or computer 60. The scene 32 to be captured is shown reconstructed and displayed at 132 on the computer 60. The use of the pseudo-randomly ordered filter 40 provides benefits, as will be described below. Particularly when utilized in combination with modern reconstruction algorithms, more accurate images are provided.

The communication between camera 58 and computer 60 may be a wired channel or alternatively may be any other optical, wireless, radio channel, or any other type of channel capable of transmitting images and videos between two points including links involving the World Wide Web (www) or the internet.

This invention teaches the acquisition and reconstruction of high quality images from a single exposure using a single sensor array. Regular masks 22 using prior art techniques would not generate images as high in quality as the pseudo-random mask 40 and reconstruction techniques of this invention. Multi-dimensional sampling using the techniques of this invention can be used to obtain high image resolution, low cost, high speed, high dynamic range or multi-spectral imaging.

The pseudo-random imaging reconstruction depends critically on a mathematical property called sparsity. Sparsity is a property whereby some data, e.g., an image, may be represented by only a few non-zero numbers (also called coefficients) which multiply an appropriate set of basis functions. Natural imagery is known to be sparse because these images can be compressed (using relatively few coefficients and Fourier or Wavelet basis functions) and accurately reconstructed from these few coefficients.

This disclosure creates a pseudo-randomly ordered mask or filter of several discrete different transparency levels (also called intensity attenuation levels) where each pixel of an imaging chip is covered by one mask transparency level. An image of a natural scene is captured through the mask. The pixels corresponding to one transparency level are called a pseudo-random image. For each exposure, then, there are several pseudo-random images each corresponding to the pixels of each transparency level. From the acquired pseudo-random images, computational methods are used to reconstruct the desired high dynamic range (HDR) image. While this exposition is with respect to HDR reconstruction, the invention applies equally to multispectral imaging, multi-polarization imaging, direction of arrival imaging, and other imaging where the incoming electromagnetic or acoustic waves may be separated by filters.

A mask of N discrete different transparency levels (also called attenuation levels or exposure levels) is created. There are, therefore, N pseudo-random images for any scene corresponding to the N attenuation levels. The darkest pseudo-random image comprises the pixels through the darkest mask. Similarly, the next darkest pseudo-random image comprises the pixels through the next darkest mask, etc. For each exposure, then, there are N pseudo-random images each corresponding to the pixels of one transparency level. For each pseudo-random image (corresponding to each transparency level), there are a limited number of observed pixels (1/N), from which to reconstruct the whole image.

In the exemplary embodiment each pixel of an imaging chip comprising n-by-m pixels is covered by an n-by-m size mask where each pixel of the imaging chip is covered by exactly one mask location and, therefore, one transparency level. In an alternative embodiment, multiple imaging chip pixels may be covered by one mask location, e.g., if the mask is of size n/2 by m/2. In yet another embodiment, the mask and imaging chip pixels need not be exactly aligned nor adjacent to each other.

The method of generating a pseudo-random mask may vary. In one example, different transparency levels, colors, polarizations, etc. are assigned independently at each mask location and uniformly throughout the mask. In more general case, mask levels can be correlated and uniformly distributed on average. The magnitude of the spatial variation of mask levels in a subset of adjacent locations is the key parameter of a distribution that may control the statistical properties of the mask. This exemplary distribution depends on the number of mask locations in the subset and on a correlation function. Specifically, in the former case of the independently distributed mask levels, the squared magnitude of spatial variation may be directly proportional to the number of mask levels in the subset. In the latter case of correlated distributions this dependence can be modified. One of the most common examples is a power law dependence where the standard deviation is proportional to $N^\gamma$ where N is the number of mask levels in a subset and $\gamma$ is a parameter we choose. For image acquisition and image processing applications the correlation, and therefore the parameter $\gamma$, can be optimized to reduce the local non-uniformity of the mask and thereby increase quality of image reconstruction.

A reconstruction algorithm is then used. One embodiment may use a well-known low-rank matrix completion algorithm. Another is to apply a dictionary learning algorithm for image inpainting. The preferred embodiment uses $l_1$/TV (Total Variation) minimization based algorithms. The basic concepts of $l_1$ and TV minimization are well known in the art and are explained further below. The different components of scenes can be reconstructed independently (called independent reconstruction) or, preferably, by joint optimization (called joint reconstruction). The independent reconstruction approach reconstructs each component of the scene independently, using only responses of the pixels corresponding to one mask level. The joint reconstruction approach reconstructs all components of the scene at once, implicitly or explicitly assuming that the structure of the scene components are related and using the responses of pixels corresponding to a plurality of mask levels. Independent reconstruction algorithms are well known in the art. The novel joint reconstruction algorithm below shows better reconstruction accuracy than independent reconstruction.

The disclosure includes the following three steps:

1) Pseudo-random Image Acquisition: a traditional image sensor with an attached pseudo-random mask takes a single exposure acquiring a plurality of pseudo-random images.

2) Image Reconstruction, e.g., with Dictionary Learning or $l_1$/TV based approaches, as explained below: Scene components are reconstructed independently or jointly. From the acquired pseudo-random images, there are two methods that may be used to reconstruct the desired high dynamic range (HDR) image. One is a local patch based method, i.e., dictionary learning based image reconstruction. The other is a global image based method, i.e. $l_1$/TV based image reconstruction. These are discussed in detail below.

3) High Dynamic Range Compression: Finally the reconstructed images are combined to generate one single high dynamic range image. The high dynamic range may optionally be compressed for display. For multi-spectral or multi-polarization imaging, this optional step may be to fuse reconstructed multi-spectral or multi-polarization images for visualization or for target detection.

Theoretical mathematical developments over the last decade in sparse sampling and sparse optimization (also called Compressive Sensing and $l_1$-regularized inverse problems) have shown new ways of recovering missing information from appropriately sampled data. The appropriate sampling requires certain pseudo-randomness of the samples in order to work properly.

Regularity to the sampling precludes the successful use of these new mathematical developments. The spatially pseudo-random sampling of a scene at a particular spectral, polarization, or transparency level allows one to accurately reconstruct the entire image as if the entire image were acquired at that spectral, polarization, or transparency level.

Natural scenes contain many spatially regular structures, e.g., windows on an office building, the pickets of a picket fence, etc. If a scene is sampled in a regular pattern, the regularity of the samples can cause problems in reconstructing the image. A well-known example is the Moiré patterns that can be seen on actor's clothing on television. In this case the regular spatial sampling of a regular spatial pattern on clothing can cause reconstruction artifacts because of the well-known effect called aliasing. Another related known example is when the temporally regular sampling of a wheel may make it appear to be alternatively moving forward and backward as it accelerates or slows. As an extreme example, regularly sampling a scene with a picket fence might have only samples from the pickets (from which the reconstruction would create the image of a solid wall) or only samples from between the pickets (from which the reconstruction would create an image with no fence at all). The reason that pseudo-random sampling works is that it is much more likely to get enough information about any regular structure to allow accurate reconstruction.

The idea of dictionary learning is to learn a compact dictionary from the pseudo-random sampled image to reconstruct the high resolution image. A dictionary (denoted as $\Phi$, also called a sampling matrix or a sensing matrix) for an image, x, allows accurate reconstruction provided that the following two conditions are satisfied:

(1) Sparsity: The mathematical representation of the image, $\Phi x$, is sparse given an over-complete and redundant dictionary $\Phi$ (the redundancy here means that the number of dictionary atoms is much larger than the dimension of image patches of x, which implies that Ox contains many zeros). As mentioned above, sparsity is a property whereby an image may be represented by only a few non-zero numbers (also called coefficients) which multiply an appropriate set of basis functions (each basis function is a vector called an atom, the collection of atoms form a dictionary as the dictionary's columns).

(2) Incoherency: The sensing matrix/measurement matrix $\Phi^T$ has full spark. The spark of a dictionary (matrix) is the smallest number of columns that are linearly dependent. Full spark means that no square submatrix of the matrix $\Phi^T$ is singular. If columns are linearly dependent, then they will add no new information to the sampling process. The spark is of use in the theory of compressive sensing, where requirements on the spark of the measurement matrix $\Phi^T$ are used to ensure stability and consistency of the mathematical techniques. A related measure of the incoherency between dictionary atoms is the well-known Restricted Isometry Property (RIP).

The pseudo-randomness of the mask is important to ensure the incoherency of the sensing matrix $\Phi^T$. A regular grid mask will have linear dependencies between dictionary atoms such that $\Phi^T$ has non-full spark and has a worse RIP than for a pseudo-random mask. Dictionary Learning reconstruction results using a spatially regular grid mask are far worse than when using a pseudo-random mask. Similarly, for $l_1$/TV based approaches, the pseudo-random sampling matrix (denoted as P, below) is the sensing matrix, which has a good RIP.

Figure 4:
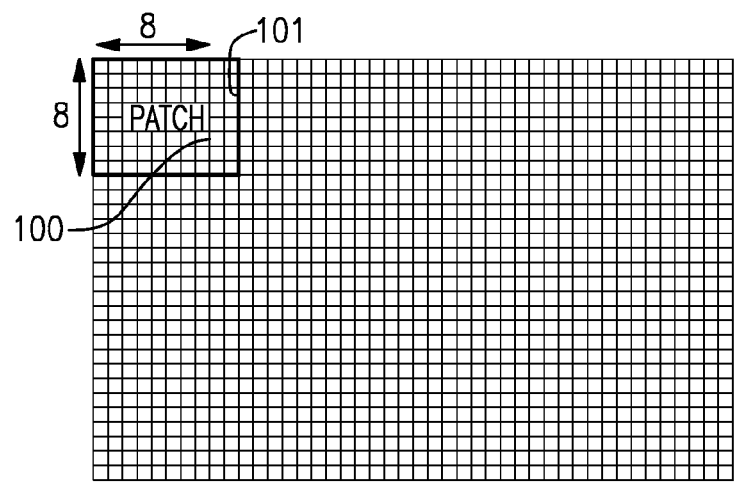
FIG. 4 graphically shows a step in a dictionary learning algorithm.

The dictionary-learning-based image reconstruction uses image patches, see FIG. 4. First, a pseudo-random image is divided into a set of overlapping patches, $x_i$, each of size a×a (for example, a=8). (Hereafter the patch $x_i$ is considered to be a column vector as with the well-known Matlab command vect($x_i$).) An exemplary patch 100 is shown in FIG. 4. The sparsity constraint is exploited in that each patch of the image is represented as a sparse combination of a set of dictionary atoms. Images can be reconstructed from an individual dictionary learned from each pseudo-random image, or from a single dictionary learned from all pseudo-random images. The learning of the dictionary is described as follows.

$$\min_{\alpha, \Phi} \sum_{i=1}^{n} \frac{1}{2} \|x_i - \Phi \alpha_i\|_2^2$$

such that $\|\alpha_i\| \leq \tau_0$
where $x_i$ are image patches, $\Phi$ is the dictionary, $\alpha_i$ are the sparse coefficients, and $\tau_0$ is a small constant. Note that we have actually expressed the $l_0$ sparsity constraint $\|.\|_0$ by the equivalent $l_1$ constraint $\|.\|_1$ as is well known from the compressive sensing literature.

The intuitive interpretation of this optimization problem is that we are computing a dictionary $\Phi$ and coefficients $\alpha$ such that the sum of the differences between the image patches $x_i$ and their approximation from a dictionary, $\Phi\alpha$, is small (each individual patch difference is the term $\|x_i - \Phi\alpha_i\|_2^2$ which measures how different the patch is from its sparse dictionary representation). The notation E is a difference measure, i.e., Euclidean distance (squared) between two vectors. The summation $$\sum_{i=1}^{n}$$

adds up all the individual patch differences.

At the same time that we minimize the patch differences, we also want to ensure that the representation is sparse (this is the term $\|\alpha_i\|_1 \leq \tau_0$) which enforces that the sparsity of $\alpha$ is less than some small number $\tau_0$ that we specify. The notation $\|.\|_0$ is the sparsity measure (also called $l_0$), a count of the number of non-zero elements of a vector, which we have replaced by its equivalent (in this case) $\|.\|_1$ (also called $l_1$).

Thus, solving this optimization problem finds a dictionary that can represent all the image patches where each patch representation only needs a few dictionary elements. The mathematical theory guarantees that if we compute this dictionary, we can reconstruct the entire image even if we only have 1/N of the actual pixel values. The dictionary learning proceeds as follows.

We may initially set the dictionary, $\Phi$, to any values or to the well known singular value decomposition (SVD) of all patches. The learning of a dictionary has two main steps:

Sparse coding step: For each patch $x_i$, compute a sparse representation, $\alpha_i$, using any pursuit algorithm (e.g., the well-known basis pursuit algorithm) such that each $x_i$ is a combination of a sparse set of the dictionary atoms.

Dictionary update step: Each atom of the dictionary $\Phi$ is updated as the first eigenvector of the error matrix from the sparsity fitting for the group of patches using this atom.

The two steps repeat until converged. This procedure is well known in the literature.

The independent reconstruction technique described next is $l_1$/TV based image reconstruction. This technique enforces sparsity over a whole image (rather than patches) in the sense that any natural image can be represented as a sparse number of coefficients over some basis (e.g., Fourier, or Wavelet), i.e., an $l_1$ constraint, or it can be represented as sparse piecewise-constant gradient field, i.e., a TV constraint. Images are reconstructed from the acquired pseudo-random images independently or jointly.

The independent reconstruction has the following $l_1$ and TV formulations:

$l_1$ formulation: $\min \|Fx\|_1$ such that $\|Px - b\| \leq \delta$, where x is the image to reconstruct, F is the inverse basis transformation (e.g., Fourier, Wavelet), P is the subsampling operator corresponding to the pseudo-random subsampling in pseudo-random image b, and $\delta$ is a small number we choose.

TV formulation: $\min \|x\|_{TV}$ such that $\|Px - b\| \leq \delta$, where $\|x\|_{TV}$ is the total variation, and P is the subsampling operator corresponding to the pseudo-random subsampling in pseudo-random image b, and $\delta$ is a small number we choose.

This is an independent reconstruction approach which does not exploit known relationships in successive pseudo-random images. In an independent reconstruction each pseudo-random image is reconstructed separately and later combined into a single HDR image. We know, however, that successive pseudo-random images, corresponding effectively to the same scene imaged at different exposure times, must be highly related to each other. An innovative joint reconstruction approach that simultaneously uses information from all the pseudo-random images may exploit more relationships and, thus, obtain better reconstruction accuracy than independent reconstruction.

To exploit the relationships between pseudo-random images, the pseudo-random images are modeled with some physical imaging constraint, e.g., the well-known camera response function. For the application of High Dynamic Range (HDR) imaging, for example, images are effectively acquired with different exposure times for different pixels, such that the camera response function (CRF) is used to model the irradiance value with regard to exposure time. The imaging model may be represented as $x_i = f(\log(\delta t_i))$, where $\delta t_i$ is the exposure time, and f is the camera response function estimated from the acquired pseudo-random images or computed a priori.

The joint reconstruction is formulated as follows.

$l_1$ formulation:

$$\min \sum_{i=1}^{n} \|Ff(\log(\delta t_i))\|_1$$

such that $\|Pf(\log(\delta t_i)) - b\| \leq \delta$, where n is the number of images to reconstruct.

TV formulation:

$$\min \sum_{i=1}^{n} \|Ff(\log(\delta t_i))\|_{TV}$$

such that $\|Pf(\log(\delta t_i)) - b\| \leq \delta$.

For the TV formulation, the well-known Split-Bregman Iteration approach is used to efficiently reconstruct the images by the following three steps:
(1) Apply the Bregman formulation by introducing auxiliary variables.
(2) Decouple the $l_1$ and $l_2$ portions of the new cost function.
(3) Solve the minimization of each cost function alternatively until convergence, by solving a classical Sylvester equation and a shrinking problem.

This disclosure advantageously exploits the pseudo-random distribution of transparencies in the mask. In particular, the disclosed image reconstruction is based on solving an optimization problem (typically mixed-norm $l_2/l_1$ optimization). A key requirement of this type of optimization problem is that the spatial (spatiotemporal) sampling is pseudo-random—specifically, it has the full spark or good RIP. The pseudo-randomness may come from any of a number of underlying pseudo-random number distributions. The pseudo-random mask can also be optimally designed to have a better spark or RIP property.

Figure 5:
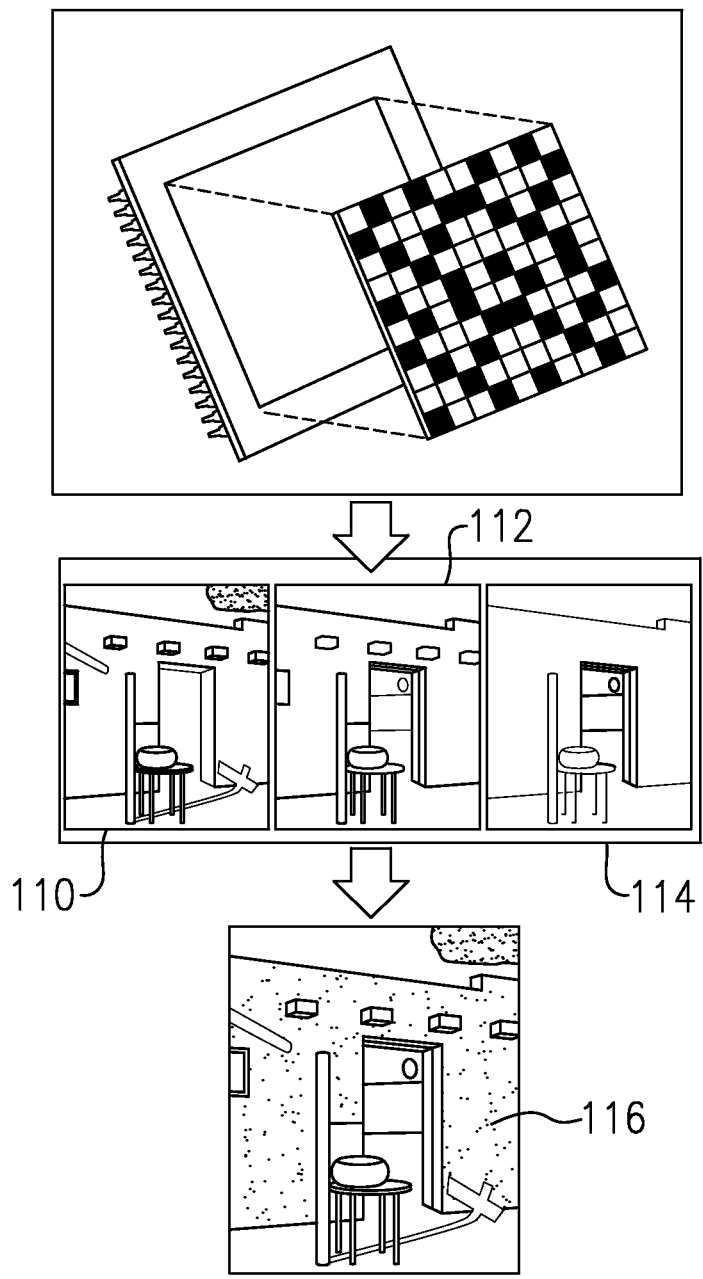
FIG. 5 shows sample images.

FIG. 5 shows the three images 110, 112, and 114, which may be reconstructed from three distinct pseudo-random images corresponding to three different intensity filters. When combined, they form a single image 116 with very high resolution and dynamic range.

In sum, the use of the pseudo-random filters provides higher resolution in the ultimate recombined image.

The term "pseudo-random" as used herein need not be truly pseudo-randomly generated. Specifically, the pseudo-random distribution may be truly random or may be approximately random as generated by any number of techniques such as spatial correlation optimized methods. It is critical that the mask or filter should simply not be regularly ordered.

This disclosure for HDR imaging first estimates the CRF from the acquired images. The CRF is then used in the mixed-norm optimization framework. The reconstruction of a single high dynamic range (HDR) image from multiple images at different exposure levels using a CRF is known in the art.

Although embodiments of this invention have been disclosed, a worker of ordinary skill in this art would recognize that certain modifications would come within the scope of this disclosure. For that reason, the following claims should be studied to determine the true scope and content of this disclosure.

The invention claimed is:

1. An image processing system comprising:
a filter associated with a sensor array, said sensor array being operable to capture an image; and
said filter constructed and arranged to separate a plurality of distinct qualities from a scene to be captured, with said filter having filter portions associated with said plurality of distinct qualities which are spatially pseudo-randomly ordered relative to each other;
an image reconstruction algorithm;
wherein said image reconstruction algorithm jointly reconstructs one or more distinct images from a plurality of pseudo-random images associated with each of said plurality of distinct qualities;
wherein the pseudo-random images are modeled with a physical imaging constraint by acquiring said pseudo-random images with different effective exposure times for different pixels and utilizing a camera response function to model an irradiance value is represented as:

$x_i = f(\log(\delta t_i))$ where $\delta t_i$ is the effective exposure time, and f is the camera response function; and
said reconstruction algorithm utilizes dictionary learning.

2. An image processing system comprising:
a filter associated with a sensor array, said sensor array being operable to capture an image;
said filter constructed and arranged to separate a plurality of distinct qualities from a scene to be captured, with said filter having filter portions associated with said plurality of distinct qualities which are spatially pseudo-randomly ordered relative to each other;
an image reconstruction algorithm;
wherein said reconstruction algorithm utilizes one or more of dictionary learning and matrix completion; and
wherein said dictionary learning image reconstruction utilizes image patches, and pseudo-random images are divided into a set of overlapping patches, each of a size a×a wherein a is greater than 1, and a dictionary is learned from the pseudo-random images as follows:

$$\min_{\alpha, \Phi} \sum_{i=1}^{n} \frac{1}{2} \|x_i - \Phi \alpha_i\|_2^2$$

such that $\|\alpha_i\|_1 \leq \tau_0$
where $x_i$ are image patches, $\Phi$ is the dictionary, $\alpha_i$ are a sparse coefficients, and $\tau_0$ is a small constant.

3. The system as set forth in claim 2, wherein said sensor array communicates with a computer provided with said reconstruction algorithm to reconstruct one or more distinct images from one or more of said distinct qualities from said scene, said distinct images are combined into a single combined image.

4. The system as set forth in claim 2, wherein the pseudo-random ordering is one of truly random, computer program generated approximately random, or spatial correlation optimized approximately random.

5. The system as set forth in claim 1, wherein the pseudo-random ordering is one of truly random, computer program generated approximately random, or spatial correlation optimized approximately random.

6. A method of image reconstruction using a filter comprising the steps of:
   providing a filter used to separate a plurality of distinct qualities from a scene to be captured, with said filter having filter portions associated with said plurality of distinct qualities of a scene which are spatially pseudo-randomly ordered relative to each other, and said filter being associated with a sensor array,
   reconstructing one or more distinct images from one or more of said distinct qualities of said scene; and wherein said reconstruction of the one or more distinct images is done jointly from a plurality of pseudo-random images associated with each of said plurality of distinct qualities; and
   wherein the pseudo-random images are modeled with a physical constraint by acquiring said pseudo-random images with different effective exposure times for different pixels and utilizing a camera response function to model an irradiance value is represented as:

$$x_i = f(\log(\delta t_i))$$

where $\delta t_i$ is the effective exposure time, and f is the camera response function.

7. The method as set forth in claim 6, wherein said reconstruction utilizes one or more of dictionary learning, $l_1$/total variation based optimization, and matrix completion.

8. The method as set forth in claim 6, wherein the pseudo-random ordering used is one of truly random, computer program generated approximately random, or spatial correlation optimized approximately random.

9. The system as set forth in claim 1, wherein said joint reconstruction then utilizing one of $l_1$ formulation or TV formulation, wherein said formulations can be formulated as follows:
   $l_1$ formulation:

$$\min \sum_{i=1}^{n} \|Ff(\log(\delta t_i))\|_1$$

such that $\|Pf(\log(\delta t_i)) - b\| \le \delta$, where n is the number of images to reconstruct;

TV formulation:

$$\min \sum_{i=1}^{n} \|Ff(\log(\delta t_i))\|_{TV}$$

such that $\|Pf(\log(\delta t_i)) - b\| \le \delta$; and
   F is an inverse basis transformation, P is a subsampling operator corresponding to the pseudo-random subsampling in pseudo-random image b, and $\delta$ is a small chosen number.

10. The method as set forth in claim 6, wherein said joint reconstruction then utilizing one of $l_1$ formulation or TV formulation, wherein said formulations can be formulated as follows:
   $l_1$ formulation:

$$\min \sum_{i=1}^{n} \|Ff(\log(\delta t_i))\|_1$$

such that $\|Pf(\log(\delta t_i)) - b\| \le \delta$, where n is the number of images to reconstruct;

TV formulation:

$$\min \sum_{i=1}^{n} \|Ff(\log(\delta t_i))\|_{TV}$$

such that $\|Pf(\log(\delta t_i)) - b\| \le \delta$; and
   F is an inverse basis transformation, P is a subsampling operator corresponding to the pseudo-random subsampling in pseudo-random image b, and 5 is a small chosen number.

11. The method system as set forth in claim 6, wherein said reconstruction algorithm utilizes dictionary learning.

12. The system as set forth in claim 2, wherein the dictionary, $\Phi$, is set to some value and the learning of a dictionary has two main steps:
   a) sparse coding step: For each patch $x_i$, a sparse representation, $\alpha i$, is computed using any pursuit algorithm such that each $x_i$ is a combination of a sparse set of the dictionary atoms;
   b) dictionary update step: Each atom of the dictionary $\Phi$ is updated as a first eigenvector of an error matrix from the sparsity fitting for the group of patches using this atom; and
   the two steps are repeated until converged.

13. The system as set forth in claim 4, wherein the pseudo-random ordering is spatial correlation optimized approximately random.

14. The system as set forth in claim 5, wherein the pseudo-random ordering is spatial correlation optimized approximately random.

15. The method as forth in claim 8, wherein the pseudo-random ordering is spatial correlation optimized approximately random.

* * * * *